(12) United States Patent
Vidyakina et al.

(10) Patent No.: US 12,507,035 B2
(45) Date of Patent: Dec. 23, 2025

(54) METHOD, APPARATUS, AND COMPUTER PROGRAM PRODUCT FOR ANONYMIZING TRAJECTORIES AND STAY POINTS

(71) Applicant: HERE GLOBAL B.V., Eindhoven (NL)

(72) Inventors: Elena Vidyakina, Berlin (DE); Gavin Brown, Berlin (DE); Elena Mumford, Eindhoven (NL); Ori Dov, Berlin (DE); Olivier Dousse, Berlin (DE); Johannes Braese, Berlin (DE); Stefano Bennati, Zurich (CH)

(73) Assignee: HERE GLOBAL B.V., Eindhoven (NL)

( * ) Notice: Subject to any disclaimer, the term of this patent is extended or adjusted under 35 U.S.C. 154(b) by 443 days.

(21) Appl. No.: 18/062,385

(22) Filed: Dec. 6, 2022

(65) Prior Publication Data

US 2023/0164513 A1 May 25, 2023

Related U.S. Application Data

(63) Continuation-in-part of application No. 17/303,688, filed on Jun. 4, 2021, now Pat. No. 11,751,007.

(51) Int. Cl.
*H04W 4/021* (2018.01)
*H04W 4/02* (2018.01)
(Continued)

(52) U.S. Cl.
CPC ........... *H04W 4/021* (2013.01); *H04W 4/023* (2013.01); *H04W 4/029* (2018.02); *H04W 12/02* (2013.01); *H04W 12/64* (2021.01)

(58) Field of Classification Search
CPC ..... H04W 4/021; H04W 4/022; H04W 4/023; H04W 4/027; H04W 4/029; H04W 12/02; H04W 12/03; H04W 12/06
(Continued)

(56) References Cited

U.S. PATENT DOCUMENTS

| 2010/0064373 | A1* | 3/2010 | Cai | ...................... | H04L 63/0421 |
| | | | | | 726/26 |
| 2012/0115505 | A1* | 5/2012 | Miyake | ................. | H04W 4/027 |
| | | | | | 455/456.1 |

(Continued)

OTHER PUBLICATIONS

Advisory Action for U.S. Appl. No. 17/303,688 dated Feb. 17, 2023.
(Continued)

*Primary Examiner* — Jean A Gelin
(74) *Attorney, Agent, or Firm* — ALSTON & BIRD LLP

(57) ABSTRACT

Embodiments described herein relate to anonymizing of trajectories of mobile devices through the obfuscation of stay points. Methods may include: receiving probe data points of a trajectory in real-time or near real-time from a probe apparatus as it travels along the trajectory; calculating, for each probe data point, a probability of the trajectory reaching a stay point within a predetermined distance; providing sequential sub-sets of probe data points of the trajectory to a location-based service provider in response to the sequential sub-sets of probe data points including probe data points having a probability failing to satisfy a predetermined value; and identifying a potentially last sub-set of probe data points of the sequential sub-sets of probe data points to provide to the location-based service provider in response to identifying a probe data point having a probability of the trajectory reaching a stay point within the predetermined distance satisfying the predetermined value.

20 Claims, 10 Drawing Sheets

(51) Int. Cl.
*H04W 4/029* (2018.01)
*H04W 12/02* (2009.01)
*H04W 12/64* (2021.01)

(58) Field of Classification Search
USPC .................................................. 455/456.1
See application file for complete search history.

(56) References Cited

U.S. PATENT DOCUMENTS

| | | | | |
|---|---|---|---|---|
| 2013/0269038 | A1* | 10/2013 | Takahashi | G06F 21/60 |
| | | | | 726/26 |
| 2014/0108361 | A1* | 4/2014 | Biswas | G06F 16/29 |
| | | | | 707/693 |
| 2014/0370844 | A1* | 12/2014 | Lara | H04W 4/21 |
| | | | | 455/405 |
| 2015/0198449 | A1* | 7/2015 | Okude | G08G 1/0112 |
| | | | | 701/408 |
| 2015/0300835 | A1 | 10/2015 | Fowe et al. | |
| 2016/0291121 | A1* | 10/2016 | Sarkar | G01S 5/0264 |
| 2018/0004226 | A1* | 1/2018 | Milstein | G01C 21/3867 |
| 2019/0225211 | A1* | 7/2019 | Hause | B60W 30/09 |
| 2019/0385093 | A1 | 12/2019 | Vollmer et al. | |
| 2020/0107163 | A1* | 4/2020 | Li | G06F 18/24137 |

OTHER PUBLICATIONS

Ding et al., "Multiuser Multivariate Multiorder Markov-Based Multimodal User Mobility Pattern Prediction", IEEE Internet of Things Journal, vol. 7, Issue 5, (Nov. 11, 2019), 13 pages.

Extended European Search Report for European Application No. 22174783.5 dated Oct. 10, 2022, 8 pages.

Final Office Action for U.S. Appl. No. 17/303,688 dated Nov. 17, 2022.

Gong et al., "Identification of Activity Stop Locations in GPS Trajectories by Density-Based Clustering Method Combined with Support Vector Machines", Journal of Modern Transportation, vol. 23, Issue 3, (Jul. 2015), pp. 202-213.

Non-Final Office Action for U.S. Appl. No. 17/303,688 dated Jul. 22, 2022.

Notice of Allowance for U.S. Appl. No. 17/303,688 dated Apr. 19, 2023.

Wu et al., "Extracting Stops from Spatio-Temporal Trajectories within Dynamic Contextual Features", Sustainability, 13(690), (Jan. 2021), 25 pages.

Xia et al., "Decision Tree-Based Contextual Location Prediction from Mobile Device Logs", Hindawi Mobile Information Systems, vol. 2018, (Apr. 1, 2018), 12 pages.

* cited by examiner

| Probe Speed | | | | | |
|---|---|---|---|---|---|
| >70kph | 50-70kph | 25-50kph | <25kph | | |

| Road Functional Class | | | |
|---|---|---|---|
| Interstate | Arterials | Collectors | Local |

| Zone | | | | | |
|---|---|---|---|---|---|
| Residential | Industrial | Commercial | Urban | Rural | Sub-urban |

| POI Density | |
|---|---|
| Dense | Sparse |

| Traffic Density | | |
|---|---|---|
| Dense | Medium | Light |

FIG. 8

```
01  buffer = None
02  For each probe arriving do:
03      If stay point detected:
04          do not publish
05          clean buffer
06
07      elif mode == 'gap':
08          do not publish
09
10      elif mode == 'sub-trajectory':
11          buffer = buffer.append(probe)
12          calculate p using stay point predictor
13          if p>p_threshold:
14              do not publish
15              mode= "delayed"
16          else:
17              publish buffer
18              clean buffer
19
20      elif mode=='delayed':
21          if delayed_size < min(gap_size, subtr_size-previous_published_subtr_size):
22              calculate p using stay point predictor
23              if p<p_threshold:
24                  publish buffer
25                  clean buffer
26                  mode = 'sub-trajectory'
27              else:
28                  buffer = buffer.append(probe)
29          else:
30              do not publish
31              mode = 'sub-trajectory'
32              clean buffer
```

FIG. 9

METHOD, APPARATUS, AND COMPUTER PROGRAM PRODUCT FOR ANONYMIZING TRAJECTORIES AND STAY POINTS

CROSS-REFERENCE TO RELATED APPLICATIONS

This application is a continuation-in-part of and claims priority to U.S. patent application Ser. No. 17/303,688, filed on Jun. 4, 2021, the contents of which are hereby incorporated by reference in their entirety.

TECHNOLOGICAL FIELD

An example embodiment of the present disclosure relates to anonymizing trajectories of mobile devices, and more particularly, to anonymizing trajectories of mobile devices in real-time or near real-time including obfuscation of stay points of the trajectories.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services. The provision of location-based services is dependent upon understanding the location of a user requesting the services. Maintaining anonymity while also being able to access location-based services is a challenge.

BRIEF SUMMARY

A method, apparatus, and computer program product are provided in accordance with an example embodiment described herein for anonymizing trajectories of mobile devices, and more particularly, for anonymizing trajectories of mobile devices in real-time or near real-time including obfuscating stay points of the trajectories. According to an example embodiment, an apparatus is provided including at least one processor and at least one memory including computer program code, the at least one memory and computer program code configured to, with the processor, cause the apparatus to at least: receive probe data points of a trajectory in real-time or near real-time from a probe apparatus as it travels along the trajectory; calculate, for each probe data point, a probability of the trajectory reaching a stay point within a predetermined distance, where a stay point includes a point where the probe apparatus dwells for at least a minimum amount of time; provide sequential sub-sets of probe data points of the trajectory to a location-based service provider in response to the sequential sub-sets of probe data points including probe data points having a probability of the trajectory reaching a stay point within a predetermined distance failing to satisfy a predetermined value; identify a potentially last sub-set of probe data points of the sequential sub-sets of probe data points to provide to the location-based service provider in response to identifying a stay point probe data point having a probability of the trajectory reaching a stay point within the predetermined distance satisfying the predetermined value; store a subsequent sub-set of probe data points received after the potentially last sub-set of probe data points; and provide the subsequent sub-set of probe data points to the location-based service provider in response to the stay point probe data point having the probability of the trajectory reaching the stay point within the predetermined distance satisfying the predetermined value being identified as a false-positive indication of reaching the stay point within the predetermined distance.

According to some embodiments, the stay point probe data point is identified as a false-positive indication of reaching the stay point within the predetermined distance in response to the probe data points of the subsequent sub-set of probe data points indicating that a stay point was not reached. According to certain embodiments, the probe data points of the subsequent sub-set of probe data points indicate that a stay point was not reached in response to the probe data points failing to correspond to a stop for at least the minimum amount of time. According to certain embodiments, the probe data points of the subsequent sub-set of probe data points indicate that a stay point was not reached in response to the probe data points failing to correspond to a privacy-sensitive location of a user associated with the probe apparatus.

According to some embodiments, the potentially last sub-set of probe data points does not include the probe data point having a probability of the trajectory reaching a stay point within the predetermined distance satisfying the predetermined value. Causing the apparatus of some embodiments to calculate, for each probe data point, the probability of the trajectory reaching a stay point within the predetermined distance includes causing the apparatus to calculate the probability of a respective probe data point based, at least in part, on a geometrical complexity of the trajectory up to the respective probe data point. According to some embodiments, causing the apparatus to calculate, for each probe data point, the probability of the trajectory reaching a stay point within the predetermined distance includes causing the apparatus to: calculate the probability of a respective probe data point based, at least in part, on an average speed of the probe apparatus approaching the respective probe data point.

The average speed of the probe apparatus approaching the respective probe data point includes, in some embodiments, the average speed of the probe apparatus over a predetermined time before the respective probe data point. The average speed of the probe apparatus approaching the respective probe data point includes, in some embodiments, the average speed of the probe apparatus over a predetermined distance before the respective probe data point. Causing the apparatus of some embodiments to calculate, for each probe data point, the probability of the trajectory reaching a stay point within the predetermined distance includes causing the apparatus to calculate the probability of the trajectory reaching a stay point within the predetermined distance of a respective probe data point based, at least in part, on a difference between a heading of at least a portion of the trajectory and a heading of the respective probe data point.

Embodiments provided herein include a computer program product having at least one non-transitory computer-readable storage medium having computer-executable program code portions stored therein, the computer-executable program code portions including program code instructions configured to: receive probe data points of a trajectory in real-time or near real-time from a probe apparatus as it travels along the trajectory; calculate, for each probe data point, a probability of the trajectory reaching a stay point within a predetermined distance, where a stay point includes a point where the probe apparatus dwells for at least a minimum amount of time; provide sequential sub-sets of probe data points of the trajectory to a location-based service provider in response to the sequential sub-sets of probe data points including probe data points having a probability of the trajectory reaching a stay point within a predetermined distance failing to satisfy a predetermined value; identify a potentially last sub-set of the probe data points of the sequential sub-sets of probe data points to provide to the location-based service provider in response to identifying a stay point probe data point having a probability of the trajectory reaching a stay point within the predetermined distance satisfying the predetermined value; store a subsequent sub-set of probe data points received after the potentially last sub-set of probe data points; and provide the subsequent sub-set of probe data points to the location-based service provider in response to the stay point probe data point having the probability of the trajectory reaching the stay point within the predetermined distance satisfying the predetermined value being identified as a false-positive indication of reaching the stay point within the predetermined distance.

According to some embodiments, the stay point probe data point is identified as a false-positive indication of reaching the stay point within the predetermined distance in response to the probe data points of the subsequent sub-set of probe data points indicating that a stay point was not reached. According to certain embodiments, the probe data points of the subsequent sub-set of probe data points indicate that a stay point was not reached in response to the probe data points failing to correspond to a stop for at least the minimum amount of time. According to certain embodiments, the probe data points of the subsequent sub-set of probe data points indicate that a stay point was not reached in response to the probe data points failing to correspond to a privacy-sensitive location of a user associated with the probe apparatus.

According to some embodiments, the potentially last sub-set of probe data points does not include the probe data point having a probability of the trajectory reaching a stay point within the predetermined distance satisfying the predetermined value. The program code instruction to calculate, for each probe data point, the probability of the trajectory reaching a stay point within the predetermined distance includes, in some embodiments, program code instructions to calculate a probability of a respective probe data point based, at least in part, on a geometrical complexity of the trajectory up to the respective probe data point. The program code instructions to calculate, for each probe data point, the probability of the trajectory reaching a stay point within the predetermined distance includes, in some embodiments, program code instructions to calculate the probability of a respective probe data point based, at least in part, on an average speed of the probe apparatus approaching the respective probe data point.

The average speed of the probe apparatus approaching the respective probe data point may include the average speed of the probe apparatus over a predetermined time before the respective probe data point. The average speed of the probe apparatus approaching the respective probe data point includes, in some embodiments, the average speed of the probe apparatus over a predetermined distance before the respective probe data point. The program code instructions to calculate, for each probe data point, the probability of the trajectory reaching a stay point within the predetermined distance includes, in some embodiments, program code instructions to calculate the probability of the trajectory reaching a stay point within the predetermined distance of a respective probe data point based, at least in part, on a difference between a heading of at least a portion of the trajectory and a heading of the respective probe data point.

Embodiments provided herein include a method including: receiving probe data points of a trajectory in real-time or near real-time from a probe apparatus as it travels along the trajectory; calculating, for each probe data point, a probability of the trajectory reaching a stay point within a predetermined distance, where a stay point includes a point where the probe apparatus dwells for at least a minimum amount of time; providing sequential sub-sets of probe data points of the trajectory to a location-based service provider in response to the sequential sub-sets of probe data points including probe data points having a probability of the trajectory reaching a stay point within a predetermined distance failing to satisfy a predetermined value; identifying a potentially last sub-set of probe data points of the sequential sub-sets of probe data points to provide to the location-based service provider in response to identifying a stay point probe data point having a probability of the trajectory reaching a stay point within the predetermined distance satisfying the predetermined value; storing a subsequent sub-set of probe data points received after the potentially last sub-set of probe data points; and providing the subsequent sub-set of probe data points to the location-based service provider in response to the stay point probe data point having the probability of the trajectory reaching the stay point within the predetermined distance satisfying the predetermined value being identified as a false-positive indication of reaching the stay point within the predetermined distance.

According to some embodiments, the stay point probe data point is identified as a false-positive indication of reaching the stay point within the predetermined distance in response to the probe data points of the subsequent sub-set of probe data points indicating that a stay point was not reached. According to certain embodiments, the probe data points of the subsequent sub-set of probe data points indicate that a stay point was not reached in response to the probe data points failing to correspond to a stop for at least the minimum amount of time. According to certain embodiments, the probe data points of the subsequent sub-set of probe data points indicate that a stay point was not reached in response to the probe data points failing to correspond to a privacy-sensitive location of a user associated with the probe apparatus.

The potentially last sub-set of probe data points in some embodiments does not include the probe data point having a probability of the trajectory reaching a stay point within the predetermined distance satisfying the predetermined value. In some embodiments, calculating, for each probe data point, the probability of the trajectory reaching a stay point within the predetermined distance includes calculating the probability of a respective probe data point based, at least in part, on a geometrical complexity of the trajectory up to the respective probe data point. According to some embodiments, calculating, for each probe data point, the probability of the trajectory reaching a stay point within the predetermined distance includes calculating the probability of a respective probe data point based, at least in part, on an average speed of the probe apparatus approaching the respective probe data point.

According to some embodiments, the average speed of the probe apparatus approaching the respective probe data point includes the average speed of the probe apparatus over a predetermined time before the respective probe data point. Calculating, for each probe data point, the probability of the trajectory reaching a stay point within the predetermined distance, in some embodiments, includes calculating the probability of the trajectory reaching a stay point within the predetermined distance of a respective probe data point based, at least in part, on a difference between a heading of at least a portion of the trajectory and a heading of the respective probe data point.

Embodiments provided herein include an apparatus including: means for receiving probe data points of a trajectory in real-time or near real-time from a probe apparatus as it travels along the trajectory; means for calculating, for each probe data point, a probability of the trajectory reaching a stay point within a predetermined distance, where a stay point includes a point where the probe apparatus dwells for at least a minimum amount of time; means for providing sequential sub-sets of probe data points of the trajectory to a location-based service provider in response to the sequential sub-sets of probe data points including probe data points having a probability of the trajectory reaching a stay point within a predetermined distance failing to satisfy a predetermined value; means for identifying a potentially last sub-set of probe data points of the sequential sub-sets of probe data points to provide to the location-based service provider in response to identifying a stay point probe data point having a probability of the trajectory reaching a stay point within the predetermined distance satisfying the predetermined value; means for storing a subsequent sub-set of probe data points received after the potentially last sub-set of probe data points; and means for providing the subsequent sub-set of probe data points to the location-based service provider in response to the stay point probe data point having the probability of the trajectory reaching the stay point within the predetermined distance satisfying the predetermined value being identified as a false-positive indication of reaching the stay point within the predetermined distance.

According to some embodiments, the stay point probe data point is identified as a false-positive indication of reaching the stay point within the predetermined distance in response to the probe data points of the subsequent sub-set of probe data points indicating that a stay point was not reached. According to certain embodiments, the probe data points of the subsequent sub-set of probe data points indicate that a stay point was not reached in response to the probe data points failing to correspond to a stop for at least the minimum amount of time. According to certain embodiments, the probe data points of the subsequent sub-set of probe data points indicate that a stay point was not reached in response to the probe data points failing to correspond to a privacy-sensitive location of a user associated with the probe apparatus.

The potentially last sub-set of probe data points in some embodiments does not include the probe data point having a probability of the trajectory reaching a stay point within the predetermined distance satisfying the predetermined value. In some embodiments, the means for calculating, for each probe data point, the probability of the trajectory reaching a stay point within the predetermined distance includes means for calculating the probability of a respective probe data point based, at least in part, on a geometrical complexity of the trajectory up to the respective probe data point. According to some embodiments, the means for calculating, for each probe data point, the probability of the trajectory reaching a stay point within the predetermined distance includes means for calculating the probability of a respective probe data point based, at least in part, on an average speed of the probe apparatus approaching the respective probe data point.

According to some embodiments, the average speed of the probe apparatus approaching the respective probe data point includes the average speed of the probe apparatus over a predetermined time before the respective probe data point. The means for calculating, for each probe data point, the probability of the trajectory reaching a stay point within the predetermined distance, in some embodiments, includes means for calculating the probability of the trajectory reaching a stay point within the predetermined distance of a respective probe data point based, at least in part, on a difference between a heading of at least a portion of the trajectory and a heading of the respective probe data point.

BRIEF DESCRIPTION OF THE DRAWINGS

Figure 1:
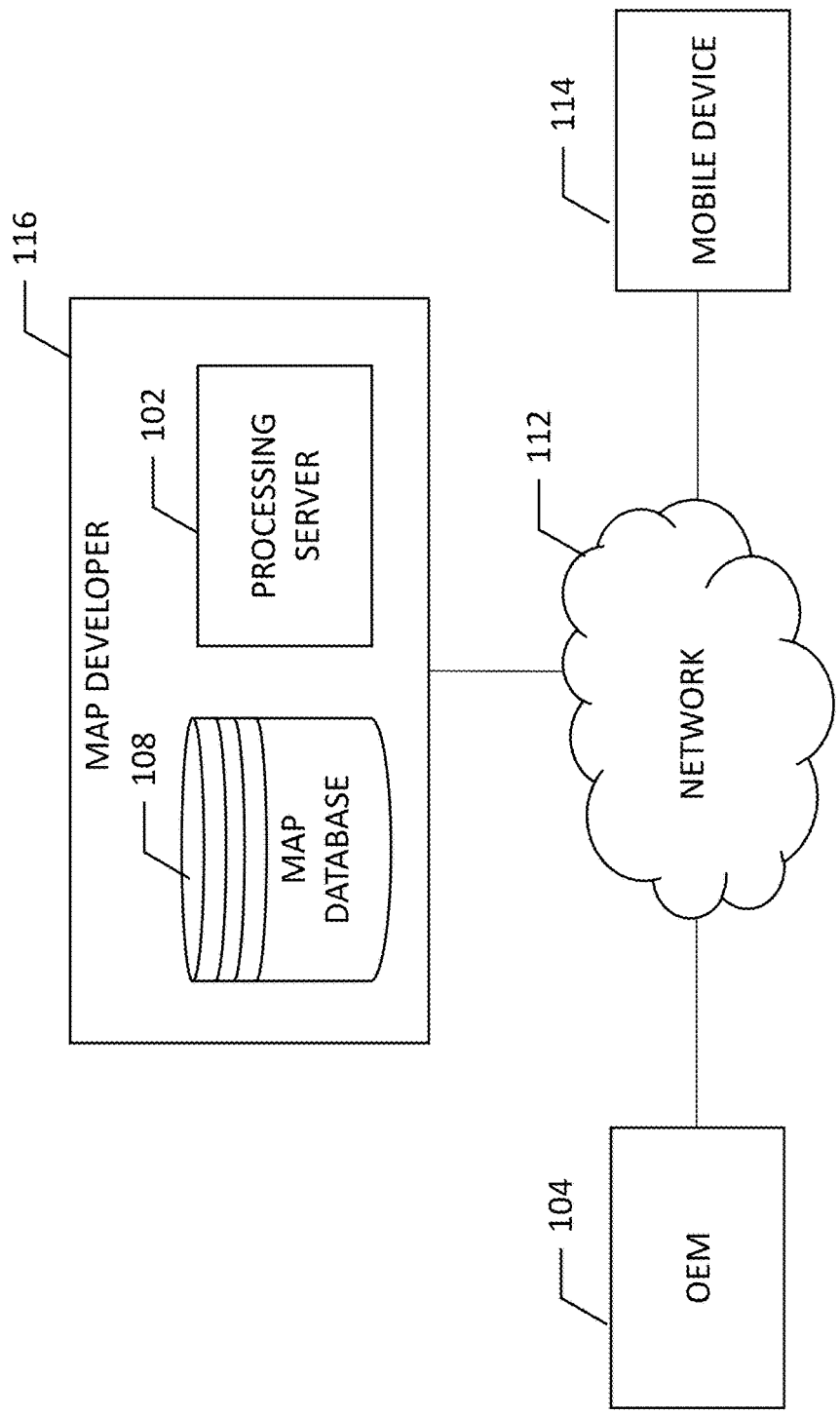
Figure 2:
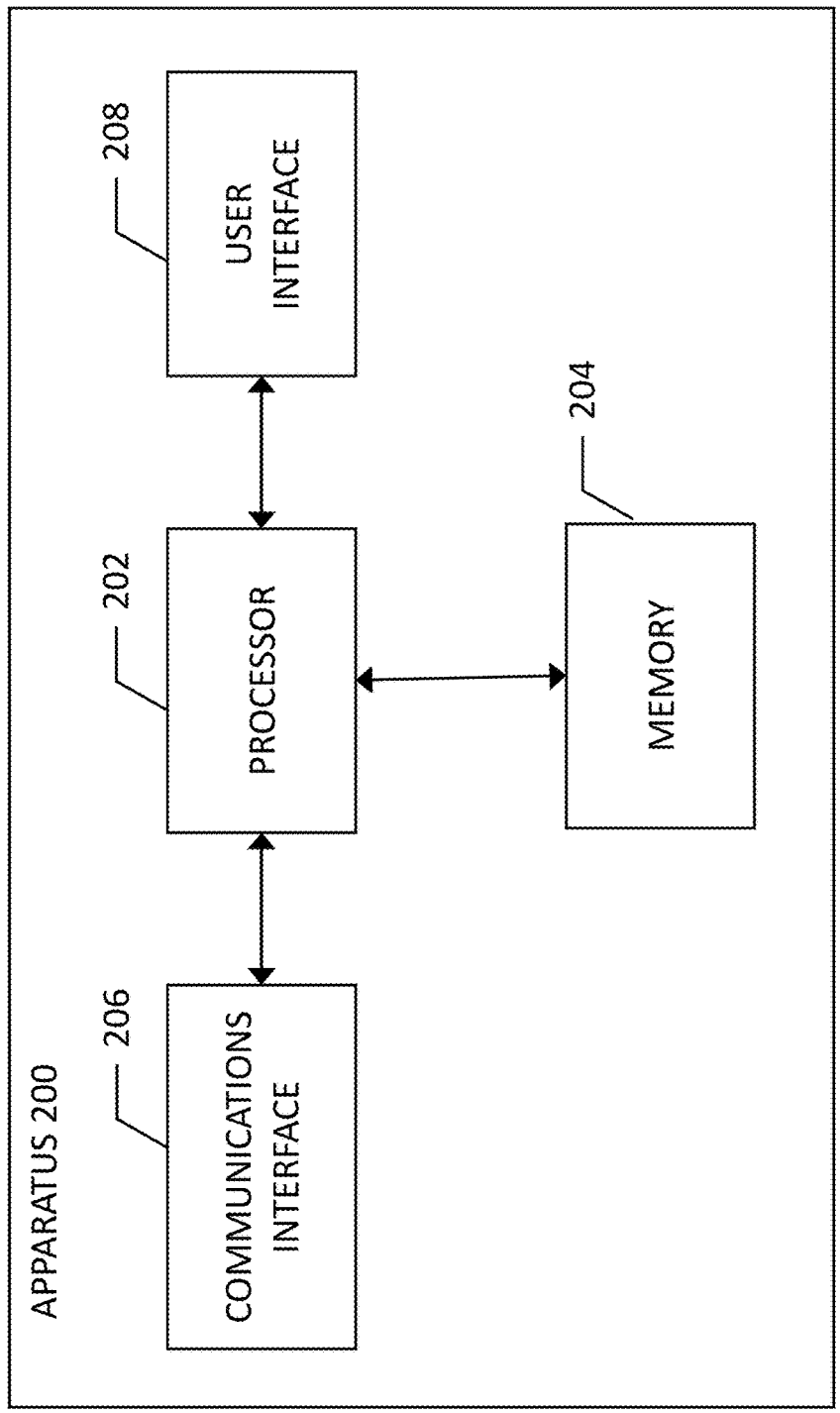
Figure 3:
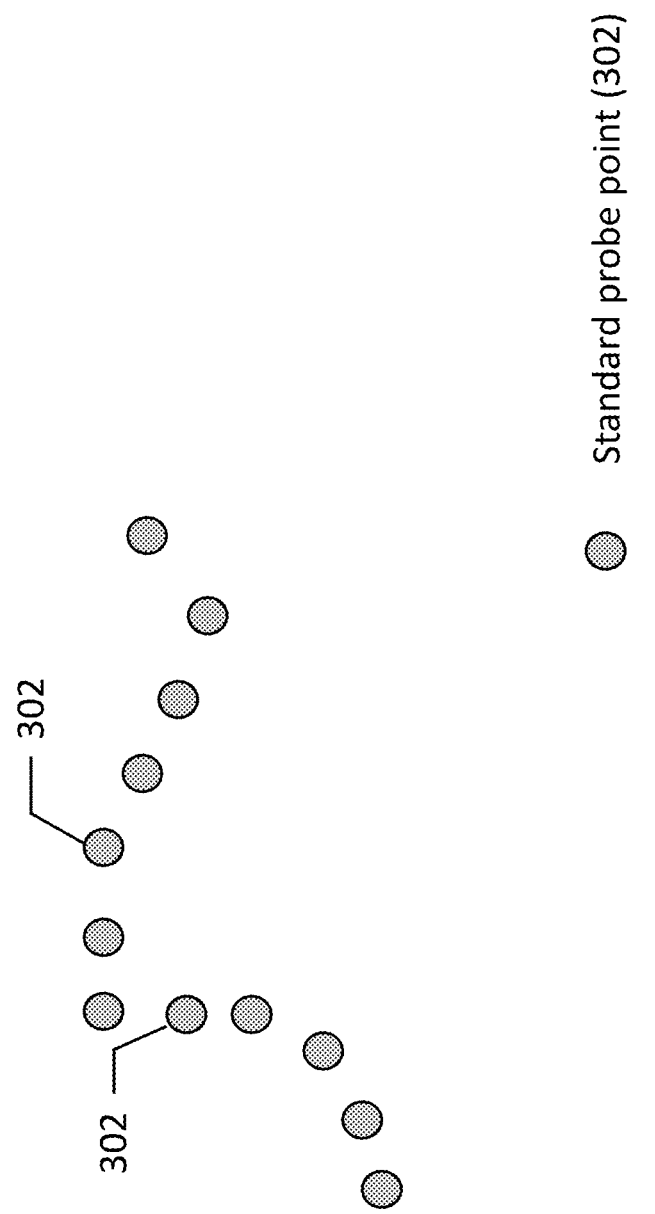
Figure 4:
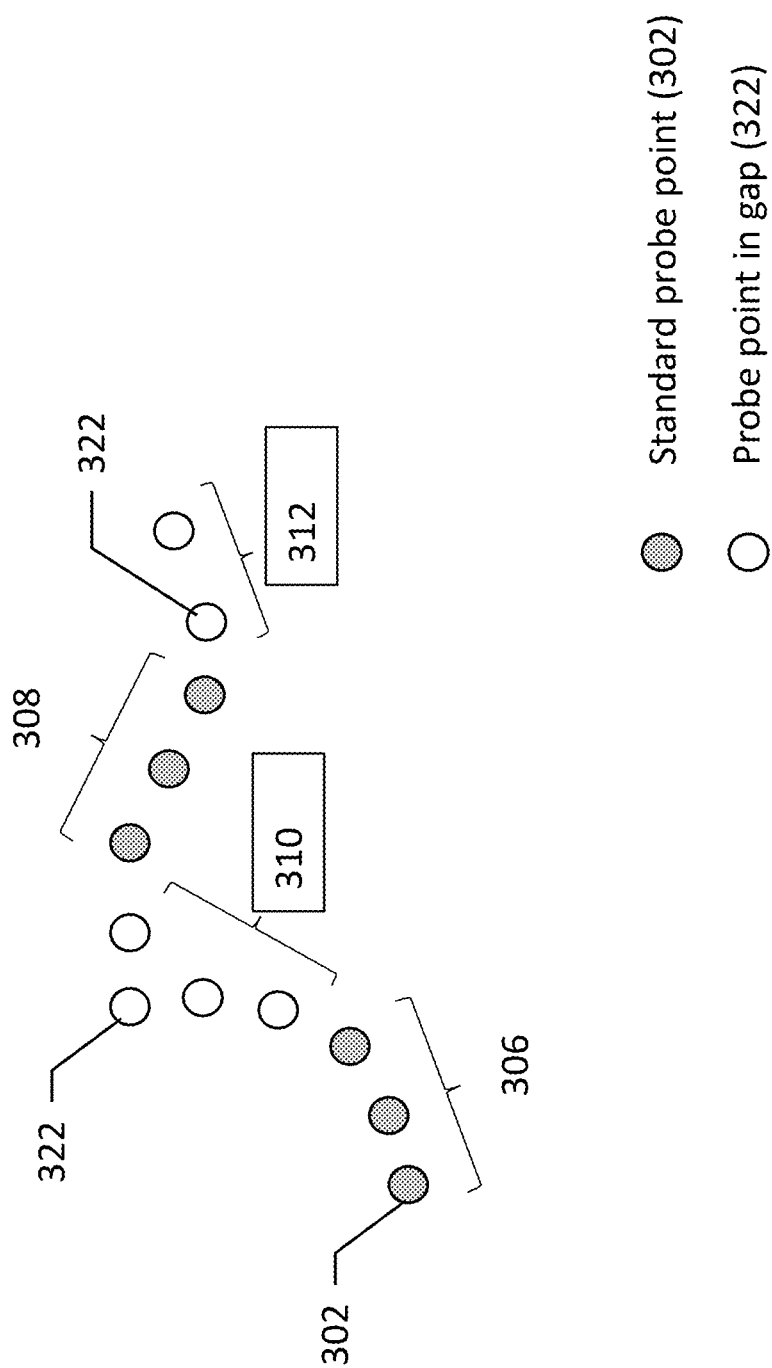
Figure 5:
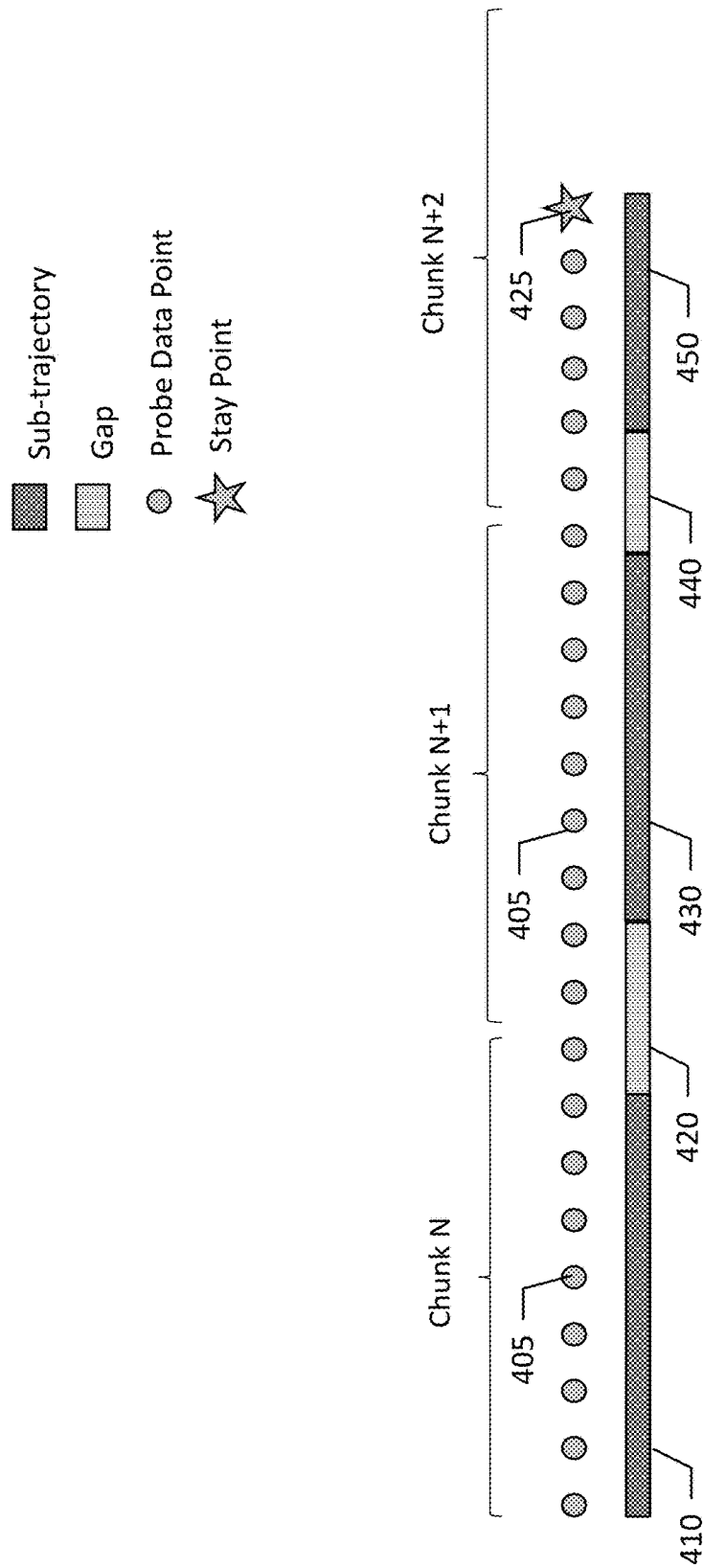
Figure 6:
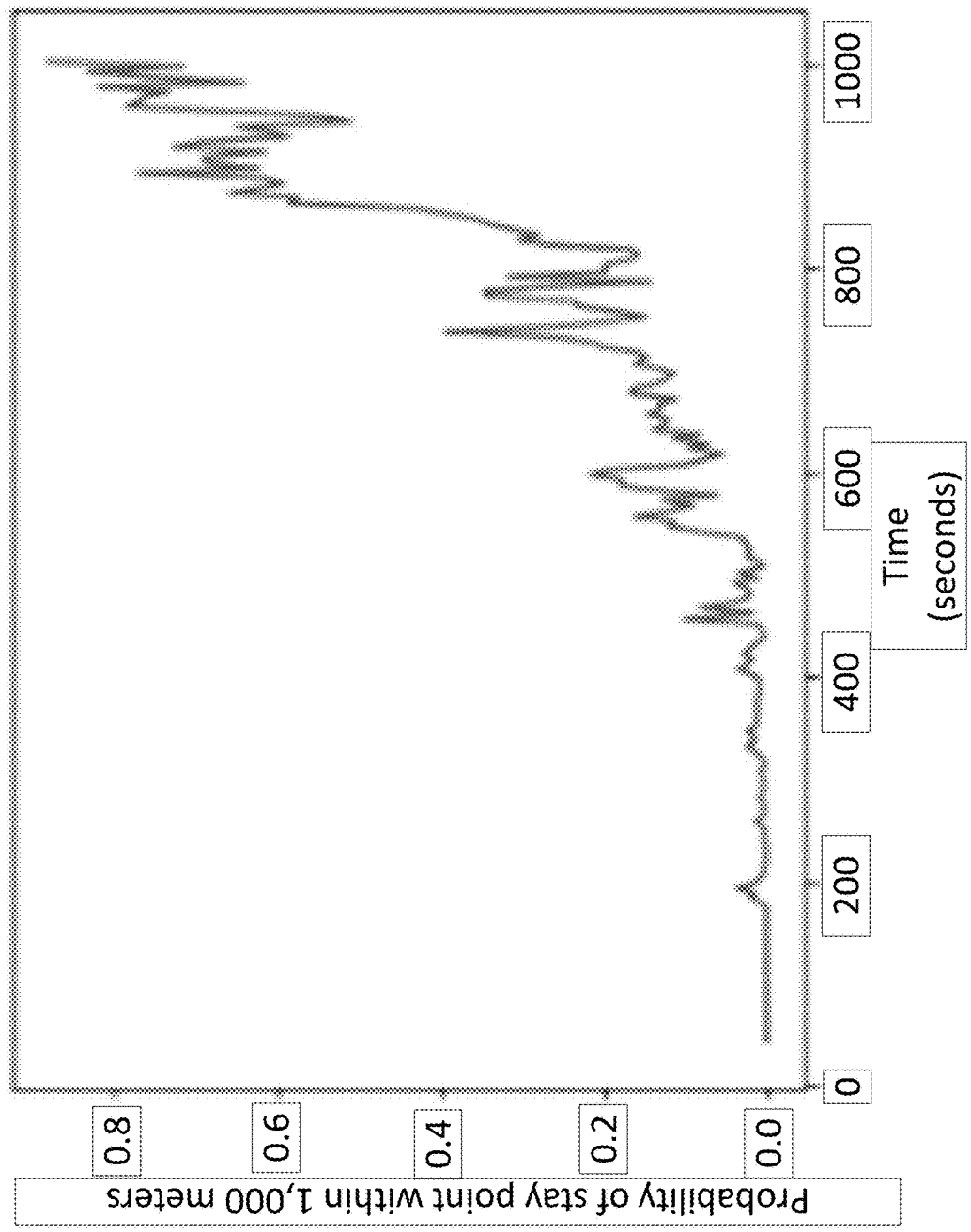
Figure 7:
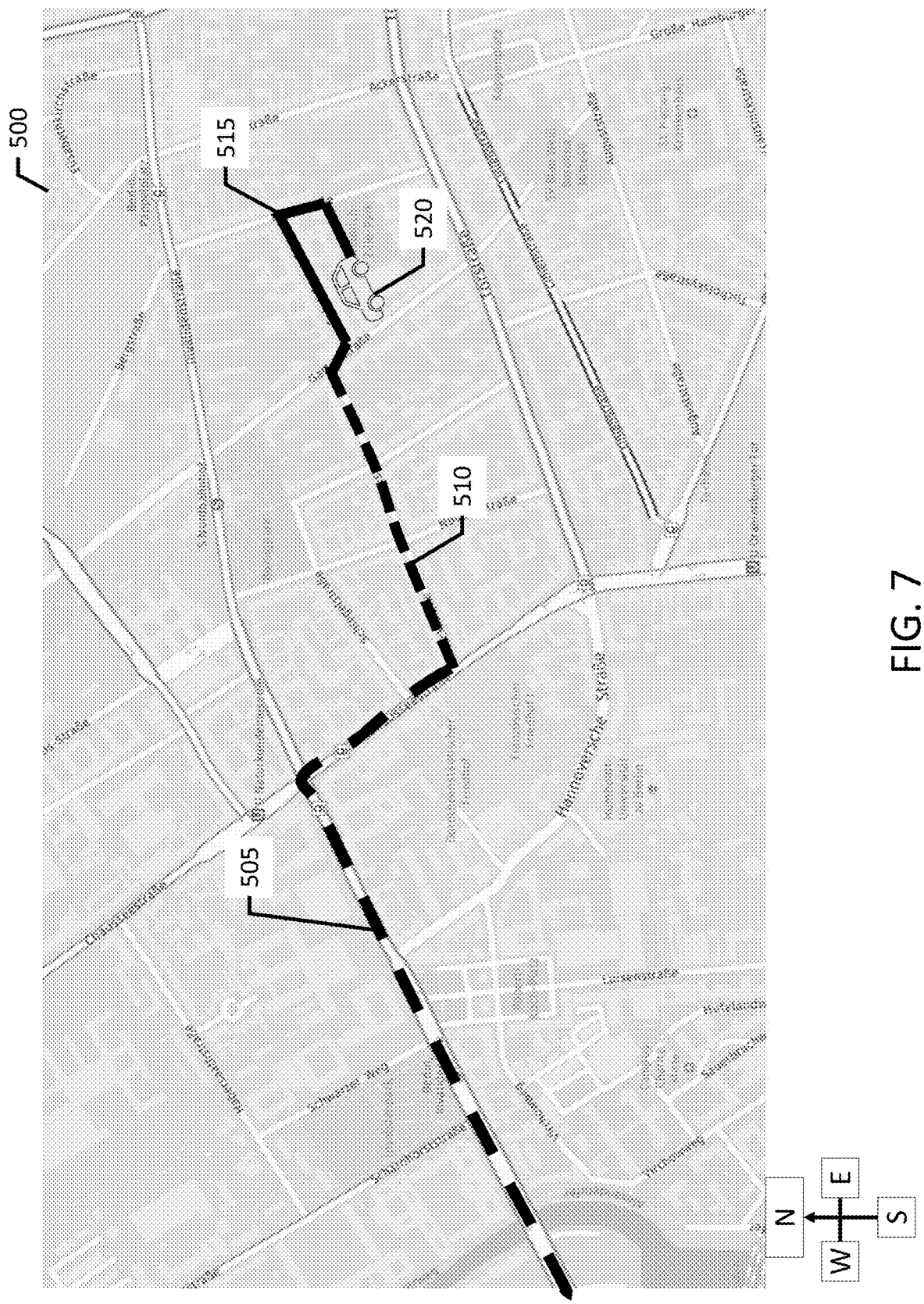
Figure 10:
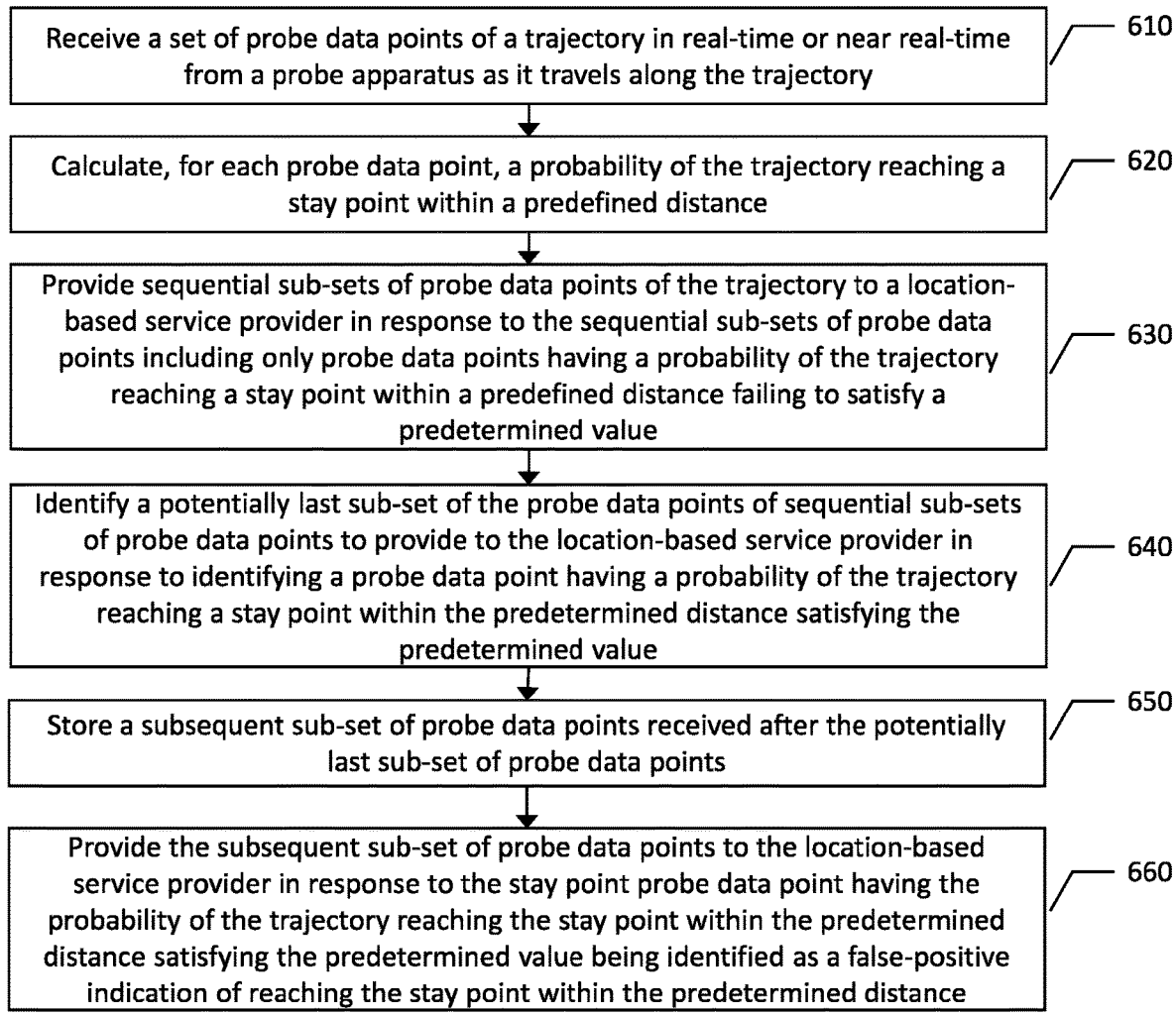

Having thus described example embodiments of the disclosure in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for anonymizing trajectories generated from probe data in accordance with an example embodiment of the present invention;

FIG. 3 illustrates a trajectory or portion thereof including a plurality of probe data points according to an example embodiment of the present disclosure;

FIG. 4 illustrates the trajectory or portion thereof of FIG. 3 anonymized by a splitting and gapping algorithm according to an example embodiment of the disclosure;

FIG. 5 illustrates a trajectory reaching a stay point and a splitting and gapping algorithm applied to the trajectory according to an example embodiment of the present disclosure;

FIG. 6 illustrates a chart of probability of probe points of a trajectory being within a predetermined distance of a stay point according to an example embodiment of the present disclosure;

FIG. 7 illustrates a trajectory to a stay point including an indication of the probability that the trajectory is within a predetermined distance of the stay point according to an example embodiment of the present disclosure;

FIG. 8 is a table of contextual clues that can influence the probability that a trajectory is within a predetermined distance of a stay point according to an example embodiment of the present disclosure;

FIG. 9 illustrates an algorithm used to buffer probe data points while establishing if the prediction of a stay point is a false positive according to an example embodiment of the present disclosure; and FIG. 10 is a flowchart of a method for anonymizing trajectories of mobile devices in real-time or near real-time including obfuscation of stay points of the trajectories according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Mobility data may be defined as a set of points or probe data points, each of which includes at least a latitude, longitude, and timestamp. Additional information may be associated with the probe data points, such as speed, heading, or other data. A trajectory includes a set of probe data points, where probe data points of a trajectory may include a trajectory identifier that associates the probe data points with one another. Mobility data captured in trajectories can be partitioned in a set of trajectories (trajectory data), each of which identifies the movement of a user over time. Anonymization of trajectories while providing sufficient information for location based services to be effective requires a balance to be struck between valuable trajectory information including location information of probe data points while also introducing ambiguity for anonymization in the form of gaps between sub-trajectories of a trajectory. These gaps provide distinction between different sub-trajectories and preclude adversaries from identifying a single trajectory belonging to a specific user and endeavor to preclude the identification of origins and destinations of a complete trajectory. However, obfuscation of stay points or the destination of a trajectory can be difficult when anonymization is performed in real-time or near real-time and stay points and destinations are not known.

Anonymization of a trajectory through the splitting and gapping of a trajectory into a plurality of sub-trajectories and gaps faces unique challenges. Anonymization in many cases must be performed in real-time or near real-time (e.g., anonymized data must be released with a short delay). For this to happen, anonymization algorithms must decide which data points to drop and which ones to keep within a given maximum delay. Anonymizing of location and trajectory data may be performed through application of privacy-enhancing algorithms on the data. Such algorithms may include splitting and gapping of trajectories to subdivide trajectories into a number of shorter sub-trajectories that are pseudonymized and separated by gaps, where data from the original trajectory is dropped. Anonymization may include the placement of these gaps. Selection of these gaps in real-time or near-real-time is challenging. The selection of the gap must be performed as soon as the data point is available for real-time and near real-time anonymization which means processing each probe data point individually. If the delay is larger (e.g., one-minute or 'near-real-time'), the anonymization can be performed on chunks of data, such as of one-minute lengths for example. In this case, the anonymized version of the data in a chunk is released as soon as the chunk ends (e.g., every one minute). Real-time, as described herein, includes performance of operations such as data transmission without any introduced delay, whereas near real-time includes performance of operations while some relatively small delay may be introduced. In the example embodiments described herein, near real-time can include within a few minutes. For example, in some embodiments, collection of data and transmitting may occur in data chunks, where the data chunk duration may be one or two minutes. This data may be transmitted in "near real-time" as in the data chunk may be transmitted with minimal delay after it is collected, such that the oldest probe data point in the data chunk is potentially as old as the data chunk duration plus a minimal processing/transmission delay, for example.

Privacy-sensitive information can be contained in trajectories, and in particular, in origins, stay points, and destinations. An origin can be deciphered from trajectory data since it is where the trajectory necessarily begins. Thus, there are various ways to obfuscate the origin. However stay points and destinations are particularly more challenging to obfuscate or hide, especially when stay points and destinations are not known by the anonymization algorithm ahead of arrival. While embodiments described herein apply to destinations, destinations may be treated as stay points, where a stay point is defined as a location where a mobile device or vehicle dwells for at least a predetermined period of time, such as more than five minutes. Thus, embodiments described herein will generally refer to stay points, which includes destinations of trajectories. Stay points where a user may dwell for a predetermined period of time can reveal privacy-sensitive information. These stay points can reveal shopping locations, medical care locations, places of work, home locations, etc. Such information may be regarded as private to an individual as they may not wish for this information to be made available to location-based service providers or to other entities, particularly when the user is unfamiliar with how such information may be used.

A method, apparatus, and computer program product are provided herein in accordance with an example embodiment for anonymizing trajectories of mobile devices, and more particularly, for anonymizing trajectories of mobile devices in real-time or near real-time including obfuscating one or more stay points of the trajectories. Trajectories for a vehicle and/or mobile device can facilitate the use of location-based services for a variety of functions. However, trajectories themselves may provide substantial information regarding an origin, destination, stay points, and path taken by a user associated with a vehicle or mobile device raising privacy concerns. Location-based services rely on accurate location information to provide the most accurate and relevant service. Location-based services are useful to a variety of consumers who may employ location-based services for a wide range of activities. Services such as the identification of traffic location and density, providing information regarding goods and services available in a specific location, and identifying a target group of consumers in a particular location or who travel along a particular path, are among many other location-based services.

While location-based services are desirable for both consumers and for service providers, consumers are often concerned with the amount of information shared about their routines and activities. Thus, while consumers and service providers want to engage with location-based services, consumers generally desire to maintain some degree of privacy.

Embodiments described herein provide a method, apparatus, and computer program product through which location information and more specifically, trajectory information can be gathered and shared in a manner that anonymizes the source of the information and makes unmasking of the source difficult, and further masks stay points of trajectories even when the trajectories are anonymized and provided to service providers in real-time or near real-time. Embodiments provided herein segment and gap a trajectory using an algorithm capable of identifying the probability that a trajectory is approaching a stay point and establishing how to best handle those stay points when disclosing the trajectory, sub-trajectories, and gaps. Embodiments employ a model trained such that it can predict a likelihood of a stay point within a predetermined distance of a probe data point. Features employed include trajectory information such as: probe data speed, trajectory distance, turns accumulated over a time window, trajectory duration, trip duration or time since the last stay point, trajectory and probe data point heading, and other information as described further below. Using the probability of a trajectory stay point occurring within a predetermined distance, embodiments can cease provision of trajectory data to location-based service providers to avoid disclosing stay points or hints to stay points while still providing valuable trajectory information to location-based services.

To provide an improved manner of anonymizing trajectories and obfuscating stay points by predicting the likelihood of a trajectory approaching a stay point, a system as illustrated in FIG. 1 may be used. FIG. 1 illustrates a communication diagram of an example embodiment of a system for implementing example embodiments described herein. The illustrated embodiment of FIG. 1 includes a map developer system 116, a processing server 102 in data communication with an original equipment manufacturer (OEM) 104 and/or a geographic map database, e.g., map database 108 through a network 112, and one or more mobile devices 114. The OEM may be one form of a trajectory source from which a trajectory of a probe or mobile device is received. The trajectory source may optionally include third party service providers or app developers, for example. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 114 may be such a subscriber. While depicted as an OEM 104 in FIG. 1, other entities may function in the same manner described herein with respect to the OEM. For example, independent location-based service providers or other entities may participate and contribute in the same manner as described herein with respect to an OEM. As such, the OEM 104 illustrated in FIG. 1 is not limited to original equipment manufacturers, but may be any entity participating as described herein with respect to the OEMs.

The OEM 104 may be configured to access the map database 108 via the processing server 102 through, for example, a mapping application, such that the user equipment may provide navigational assistance to a user among other services provided through access to the map developer 116. According to some embodiments, the map developer 116 may function as the OEM, such as when the map developer is a service provider to OEMs to provide map services to vehicles from that OEM. In such an embodiment, the map developer 116 may or may not be the recipient of vehicle probe data from the vehicles of that manufacturer. Similarly, the map developer 116 may provide services to mobile devices, such as a map services provider that may be implemented on a mobile device, such as in a mapping application. According to such an embodiment, the map developer 116 may function as the OEM as the map developer receives the probe data from the mobile devices of users as they travel along a road network.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel, example embodiments may be implemented for bicycle travel along bike, watercraft travel along waterway navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data, directly or indirectly, from a mobile device 114, such as when the map developer is functioning as the OEM 104. Optionally, the map developer 116 may receive probe data indirectly from the mobile device 114, such as when the mobile device 114 provides probe data to the OEM 104, and the OEM provides certain elements of the probe data to the map developer 116. The OEM 104 may anonymize the probe data or otherwise process the probe data to maintain privacy of a user of the mobile device 114 before providing the data to the map developer 116. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 and/or an OEM 104 may be embodied in an apparatus as illustrated in FIG. 2. The apparatus, such as that shown in FIG. 2, may be specifically configured in accordance with an example embodiment of the present disclosure for anonymizing trajectories of mobile devices, and more particularly, to segmenting a trajectory and introducing gaps between the trajectory segments or sub-trajectories based on tailored use cases to retain portions of the trajectory that have higher utility. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more OEM 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

The apparatus 200 of some embodiments may be integrated with or otherwise on-board the vehicle whereby the apparatus 200 may be equipped with or in communication with (e.g., via communications interface 206) one or more sensors, such as a Global Navigation Satellite System (GNSS) sensor (e.g., GPS, Galileo, GLONASS, etc.), accelerometer, image sensor, inertial measurement unit (IMU), gyroscope, magnetic field sensor, etc. Any of the sensors may be used to sense information regarding the location, movement, positioning, or orientation of the apparatus for use in identifying a location of the apparatus 200. In some embodiments, the apparatus 200 may derive information regarding location, movement, position, or orientation of the apparatus 200 based on communication signals perceived by the communications interface 206 such as through signal triangulation or signal fingerprinting, for example. In some embodiments, the apparatus may combine both sensor information and communication signals to drive a location of the apparatus 200.

Location-based services (LBS) such as real-time traffic information, fleet management, and navigation among others, are based on the analysis of mobility data that users of such services provide. Mobility data is associated with a privacy level and accuracy value. An accuracy value is based on the intrinsic utility of data toward the generation of location-based services. The privacy value reflects the sensitive information that mobility data reveals about a user's habits, behaviors, and personal information such as their home and/or work address.

Location-based service providers endeavor to collect as much location data as possible to maximize the accuracy of the location-based services, while attempting to minimize the associated risks for the privacy of the users particularly as it relates to the inadvertent disclosure or misuse of data. To reduce the privacy risk, location-based service providers may apply privacy-enhancing algorithms on data. Privacy-enhancing algorithms function by removing or altering features of the data that may remove privacy, and this operation typically renders the data less accurate and thus less valuable for the location-based service provider.

Some location-based services, such as traffic, require low data latency, such that anonymization of trajectory data must be performed in real-time or near real-time. An example anonymization technique uses splitting and gapping of the trajectory, where the trajectory is only published to a location-based service provider after anonymization is applied. Anonymization in this manner splits input trajectory data into a number of sub-trajectories associated with different trajectory identifiers (IDs) and gaps are left between the sub-trajectories, such that it is not obvious for an adversary as to how to reconstruct a trajectory that has been split and gapped. The sizes of the sub-trajectories and gaps can be configured based on parameters of the anonymization algorithm and can be set or tuned according to the use case.

While splitting and gapping of trajectories is an effective method of anonymizing trajectories, in order to increase privacy, additional considerations need to be provided for stay points of a trajectory as stay points may reveal sensitive information (e.g., home, work addresses) or be used to link a dataset to an external source, such as a stay point near a hospital linked to medical records. Stay points may be located anywhere along a trajectory including an origin, a destination, and any waypoints where a user stops for at least a predetermined amount of time. For trajectories without waypoints, stay points may be limited to the origin and destination. A standard technique to obfuscate stay points can include cutting off the beginning and/or end of a trajectory. This technique works well for trajectory origins and for historical data where trajectory origins and destinations are known; however, this technique is less effective for real-time or near real-time anonymization of trajectories. While obfuscating an origin stay point can be performed in real-time or near real-time, there exists no obvious way to obfuscate a destination stay point without prior knowledge of the destination stay point location. In real-time and near real-time, trajectory data chunks are received periodically during the trajectory as the trajectory is traversed, and only when a mobile device or vehicle has stopped sending new positions/probe data points or when the device is stationary can a stay point be identified. Embodiments described herein obfuscate stay points of a trajectory in real time.

Embodiments described herein provide privacy to users of location-based services by adding uncertainty regarding one or more stay points of a trajectory. An origin, destination, separately or as a pair, and even portions of a trajectory not including the origin or destination, can reveal sensitive locations regarding the user that generated the trajectory data, such as a home location and/or a work location, a path there between, route preferences, tendencies, or the like. Further, identification of an origin, a destination, or other stay points may render the identity of the individual user relatively easy to obtain.

While some stay points, such as origin, destination, work location, home location, and/or school/daycare locations, can be privacy-sensitive stay points, other stay points may not have the same privacy risks. For example, a stay point that is a gas station may not be privacy-sensitive. While embodiments described herein generally avoid revealing stay points in probe data provided to a location-based service provider, some embodiments can consider the privacy sensitivity of stay points in determining whether probe data associated with a given stay point can be disclosed to a location-based service provider. As such, stay points of example embodiments may include a degree of sensitivity of a stay point, and use the degree of sensitivity in determining whether to provide such a stay point to a location-based service provider. A measure which may be considered in determining sensitivity can include, for example, a number of people (e.g. represented by apparatuses) visiting a location associated with a stay point. If thousands of people visit a particular location daily, that location may not be deemed privacy-sensitive, for example.

Trajectory data as described herein is defined as a set of data points, each data point including a location and a timestamp. The location may be in the form of latitude and longitude, and potentially altitude. Additional information may be associated with a data point, such as speed, heading, etc. If a trajectory identifier is associated with each point, the trajectory data can be partitioned into a set of trajectories, each of which identifies the movement of a user over a period of time.

Location-based service providers may provide trajectory data to customers, such as municipalities interested in traffic optimization, data producers (e.g., drivers who share their trajectory data with the service provider), or the like. Any trajectory that reveals a user's behavioral patterns (e.g., going from A to B) can potentially reveal privacy-sensitive information and locations. Embodiments described herein mitigate this issue by segmenting a trajectory and introducing gaps between the trajectory segments or sub-trajectories, and obfuscating stay points of a trajectory by ending the trajectory at least a predetermined distance from where a stay point is estimated to be to introduce uncertainty about the actual stay points of the trajectory while maintaining the usefulness of the trajectory information for location based services.

FIG. 3 illustrates a trajectory including probe data points 302. As the probe apparatus (e.g., a mobile device, vehicle, etc.) travels along a route, probe data points are generated and provided, such as to OEM 104. These probe data points form a trajectory. Disclosure by the OEM of the whole trajectory presents a privacy concern for the source of the trajectory, as information relating to origin, destination, stay points, path taken, etc. can be privacy-sensitive information that a person may not wish to reveal, particularly when they are unaware of to whom the information is revealed or how it may be used.

FIG. 4 illustrates anonymization of the trajectory of FIG. 3 where the trajectory is segmented and gapped, whereby first sub-segment 306 and second sub-segment 308 are identified by an algorithm, and first gap 310 and second gap 312 are also identified by the algorithm. The sub-segments of the trajectory are provided to location-based services, while the gaps are not, thereby providing a degree of anonymization of the trajectory data that may preserve the privacy of the source of the trajectory.

According to an example embodiment, a near real-time scenario may be used where a location-based service has a requirement relating to the freshness of data, where data may need to be processed within e.g. one or two minutes of its generation. In this scenario, the OEM 104 decides to anonymize the trajectory data represented by a plurality of probe data points in chunks of length chunk length seconds (e.g., one minute minus delta, where delta is the processing time required by the anonymization algorithm and any other overhead). Each stream of data (probe data points forming a trajectory) from a vehicle or mobile device 114 is split into chunks of certain size chunk length for anonymization. The data may be collected into a buffer, which has a capacity of chunk length seconds. Once the buffer is full, the data contained in the buffer is provided to the anonymization algorithm and the buffer is emptied ready to receive the next chunk of probe data points.

An anonymization algorithm determines the size of gaps and sub-trajectories based on some provided constraints including the range of possible sizes (lengths) of the gaps and sub-trajectories. The choice of sizes determines the location of sub-trajectories and gaps, hence what data is kept and what data is dropped from the anonymized data. A decision function may be used to determine the size of the gaps and trajectories and it may be performed by random sampling or by a more intelligent algorithm. While splitting and gapping of the trajectory is an effective method of anonymizing the trajectory in real-time or near real-time, stay points of a trajectory may inadvertently be revealed when a trajectory ends.

Embodiments described herein provide a method of anticipating stay points of a trajectory such that probe data point information associated with the trajectory may cease to be shared ahead of reaching the stay point of the trajectory. One method of obfuscating stay points of a trajectory can include ceasing provision of a chunk of probe data points in response to a chunk prematurely ending. FIG. 5 illustrates an example embodiment of a trajectory including a plurality of probe data points 405 along a route. The trajectory is split and gapped according to an anonymization algorithm as the probe apparatus (e.g., mobile device 114) progresses along the route. This example relates to both real-time and near real-time anonymization of a trajectory. Based on the anonymization algorithm, the probe data is collected in chunks, where Chunk N includes a first sub-trajectory 410 and a portion of a gap 420. Chunk N+1 includes the remainder of gap 420, sub-trajectory 430, and the beginning of gap 440. Chunk N+2 includes the remainder of gap 440, and sub-trajectory 450 that ends prematurely with stay point 425.

According to an example embodiment described herein, to avoid a privacy risk associated with disclosing the sub-trajectory 450 that ends at the stay point 425 with an incomplete chunk of probe data, Chunk N+2 could be discarded and not published, thereby ending the trajectory with Chunk N+1 and the last published trajectory probe data point as the last probe data point of sub-trajectory 430.

While ceasing publication of chunks of data of a trajectory can provide a method of obfuscating stay points of a trajectory, further embodiments described herein provide additional methods that analyze the trajectory data to predict when a trajectory is within a predetermined distance of a stay point. Embodiments described herein employ a machine learning model to predict if a trajectory is going to reach a stay point within a predetermined distance. An example machine learning model may include a deterministic algorithm that uses model features or other system measurements as parameters, defines thresholds relating to the likelihood of an imminent stay point, and calculates the probability of approaching a stay point within a predetermined distance based on these thresholds. Features that can be used in the model can vary depending upon the data that an anonymization algorithm receives. When probe data includes only location (e.g., longitude and latitude), a timestamp, and a trajectory identifier, the machine learning model can use this information for various ways of predicting an imminent stay point. A machine learning model may process trajectories for stay points to obtain ground truth locations for stay points. Input data in the form of trajectories can be scanned to mark a stay point for every probe data point that satisfies predefined criteria. For example, a stop condition criterion, where a probe apparatus (e.g., a vehicle) has been stopped for at least a predetermined time (e.g., five minutes). This may be established based on all consecutive probe data points in intervals with timestamps within 300 seconds of one another having speeds below a predefined threshold (e.g., five kilometers per hour) and/or a total distance travelled among those probe data points being less than a predefined threshold (e.g., thirty meters), then all probe data points in that interval can be considered stay points. Another criterion may include a time-jump of probe data points, where there is a large difference between consecutive probe data points, but the distance between the consecutive probe data points is less than a distance that would have been moved at a reasonable speed, the consecutive probe data points may be considered a stay point. Other criteria may include a spiral criterion, whereby the speed of a sequence of probe data points may be relatively high, but the distance of the sequence of probe data points is low, the probe apparatus may be in a parking garage ramp. Another criterion may include an end-stop, whereby a probe data point is a last probe data point in a trajectory and the speed associated with that probe data point is below a predetermined value (e.g., five kilometers per hour).

The machine learning model of example embodiments may thus rely on features such as speed at the last probe data point, average speed of the probe apparatus within a predetermined time window, a geometrical complexity of a trajectory, a distance travelled between the previous two probe data points, a mean travelled distance between consecutive pairs of probe data points within a time window, and/or a difference between a primary heading of a trajectory and a heading of the most recent probe data point to establish stay points and the likelihood of a stay point occurring within a predetermined distance. The minimal set of features of the probe data points may be extended with other parameters, such as for a duration of a trajectory, information that can be derived from map data, point-of-interest type proximate probe data points, point-of-interest density proximate probe data points, an accessibility index, or the like. The relevant map data would correspond to an area of the trajectory and include attributes of the road links traversed by the trajectory, such as a direction of travel, number of lanes, functional class, speed limits, and potentially objects along the road segments such as traffic signs, traffic lights, parking spaces, public transit stops, etc. These features may be used as inputs to the machine learning model to help generate predictions for the probability of a stay point occurring within a predetermined distance.

As probe data is received, the probe data may be anonymized in real-time or near real-time as described above. While the aforementioned anonymization algorithm relates to splitting and gapping, embodiments described herein for obfuscating stay points of a trajectory may be implemented in various different anonymization methods. Using information from the probe data points, embodiments of the present disclosure calculate the probability of reaching a stay point of the trajectory within a predetermined distance. The probability can be used in several ways to obfuscate a trajectory stay point to improve the privacy associated with a trajectory.

According to an example embodiment, once it is established that the probability of a trajectory reaching a stay point within a predetermined distance satisfies a predetermined value, publication of the trajectory may be stopped. This may be in the form of a data chunk of a trajectory including a probe data point at which it was determined that the probability of the trajectory reaching the stay point within the predetermined distance satisfies the predetermined value is not sent to a location-based service provider. Referring again to the example embodiment of FIG. 5, if the probability of a trajectory reaching a stay point within a predetermined distance satisfies a predetermined value at a probe data point in Chunk N+1, the chunk of probe data of Chunk N+1 may be discarded (along with Chunk N+2) and not provided for location-based services. This would render sub-trajectory 410 as the last published sub-trajectory, thereby rendering it difficult for an adversary to determine stay point 425 from the last sub-trajectory 410.

According to another example embodiment described herein, the probability of a trajectory reaching a stay point within a predetermined distance may be used as an additional condition in a splitting and gapping anonymization algorithm. For example, a gap may be initiated in the probe data if the probability of a trajectory reaching a stay point within a predetermined distance satisfies a predetermined value and/or if the current sub-trajectory size (duration) is at least a minimum required sub-trajectory size.

FIG. 6 illustrates an example embodiment of a probability of a vehicle reaching a stay point within a next 1,000 meters as it changes along a route of a vehicle. As the vehicle progresses along the trajectory, the probability increases, and as the vehicle approaches a destination, the probability becomes very high due to the changes in probe data patterns and attributes. These probe data patterns and attributes are used in various manners to establish the likelihood of approaching a stay point as described further below.

FIG. 7 illustrates a map 500 including a vehicle 520 that has traversed a route to a stay point. As shown in trajectory portion 505, the probability of reaching a stay point within a predetermined distance is low. This may be due to the road being a major road, such as a limited-access expressway, that is generally used for covering long distances. As the trajectory turns off of the main roads onto trajectory portion 510, the probability increases as surface streets, such as residential roads or roads through an urban environment, are generally only used when approaching a destination or stay point. As additional turns are made on the trajectory, the probability of reaching a stay point within a predetermined distance becomes very high in trajectory portion 515, before the vehicle 520 reaches its stay point as shown.

The probe data attributes and probe data patterns may be used to determine the probability of a trajectory approaching a stay point as described above, as the probe data attributes and patterns provide hints as to the behaviors indicative of approaching a stay point. One or more probe data attributes and patterns may be used, and multiple attributes and patterns may provide for a more robust probability calculation.

According to an example embodiment, probe data point speeds can be used in calculating probabilities of trajectories being within a predetermined distance of a stay point. The probe data point speeds may be used individually from probe data points or cumulatively, such as an average over a window of time. Probe data points that have sequentially progressed from very high speeds (e.g., limited-access highway speeds) to very slow speeds may be indicative of a trajectory approaching a stay point. However, probe data point speeds alone may not provide a high confidence in the probability. If the probe data point speeds going from very fast to very slow remain on a limited-access freeway, the probe data point speeds may be indicative of heavy traffic. Thus, context of the probe data points may optionally be used.

Probe data point speeds can optionally be averaged over a time window to establish a probability of a trajectory approaching a stay point. For example, probe data point speeds averaged over the prior five minutes may provide an indication of probability of approaching a stay point. If vehicle speeds slow, a destination or stay point may be approaching.

A geometrical complexity of a trajectory may be indicative of a probability of a trajectory approaching a stay point. Generally, trajectories when they are a substantial distance from a stay point (e.g., several kilometers), are straight or lack complexity as they are directed generally toward a stay point. As the trajectories approach a stay point, they may include turns that suggest a stay point is near. The example trajectory of FIG. 7 illustrates such a scenario in which the trajectory becomes more complex (e.g., includes more turns and shorter straight sections) as the trajectory approaches a stay point. The probability of a trajectory approaching a stay point may increase with the number of turns taken within a predetermined period of time or within a predetermined distance. For example, three turns within a distance of 250 meters suggests a stay point is approaching and the probability should be increasing.

Another factor that can influence the probability that a trajectory is approaching a stay point is a distance traveled between the last two probe data points. If this distance is low, a vehicle of the trajectory has traveled slowly between the probe data points, regardless of the speeds of the probe data points. A short physical distance between to probe data points, without an indication of heavy traffic, may be indicative of an increase in probability that the trajectory is approaching a stay point within a predetermined distance. A similar approach may be applied to a mean traveled distance between consecutive pairs of probe data points within a time window.

According to some embodiments, a direction of a probe data point may provide an indication of a trajectory approaching a stay point. If a probe data point includes a heading or direction that is substantially different (e.g., more than 30 degrees) than the heading of at least a portion of a trajectory, such as a primary heading of a most recent portion (e.g., predefined distance or predefined duration) of a trajectory, then the trajectory may be approaching a stay point. This is also exemplified in the trajectory of FIG. 7, where the primary heading of the trajectory is northeast, as clear from the major sections of trajectory portion 505 and trajectory portion 510, and the vehicle travels southeast and southwest as it travels along trajectory portion 515 as it approaches the stay point.

Embodiments may further employ contextual clues to establish a probability of a trajectory approaching a stay point. FIG. 8 illustrates a table of contextual clues that may be used to calculate a probability of a trajectory approaching a stay point within a predetermined distance. These contextual clues may include probe data point speeds, as noted above, where speeds above 70 kilometers per hour (kph), for example, suggest a trajectory is not approaching a stay point within a predetermined distance, while speeds below 25 kph, for example, may suggest that the trajectory is approaching a stay point within a predetermined distance. The probe data point speed context may be used together with a traffic density context to weight the respective context. For example, a speed below 25 kph in dense traffic may negate the probability that the trajectory is approaching a stay point within a predetermined distance.

Beyond probe data point speed and traffic context clues, the road functional class may provide a contextual clue. A trajectory is unlikely to have a stay point on an interstate class of road unless such a stay point is at a rest stop. As such, probe data points of a trajectory traveling along an interstate may suggest a low probability of approaching a stay point within a predetermined distance. Probe data points of a trajectory along a local road may indicate that the trajectory may be approaching a stay point within a predetermined distance. Further, contextual clues such as the type of area in which probe data points are found may influence the probability that a trajectory is approaching a stay point. For example, a stay point may be relatively unlikely to be found in an industrial or rural zone, while a stay point may be more likely in a residential or urban zone. Thus, the surroundings of a probe data point may influence the probability of a trajectory approaching a stay point. Further point-of-interest density around a probe data point may influence the probability that a trajectory is approaching a stay point. For example, a dense point-of-interest region is more likely to be associated with a stay point of a trajectory than a sparse point-of-interest region.

Each of the aforementioned contextual clues may be used in calculating a probability of a trajectory being within a predetermined distance of a stay point. While some of the contextual clues may not provide a probability of a trajectory being within a predetermined distance of a stay point with a high reliability, the combination of contextual clues and/or properties of the probe data points themselves may be used to identify, with a relatively high confidence, a probability of a trajectory being within a predetermined distance of a stay point.

As noted above, real-time and near real-time anonymization of trajectories can be problematic when handling stay points of the trajectory, and may inadvertently provide clues as to stay points of a trajectory. According to example embodiments described herein, a machine learning model may calculate a probability that a trajectory is within a predetermined distance of a stay point using probe data points and possibly using contextual clues. A threshold value may be established for the probability, such that when a probability of trajectory being within a predetermined distance of a stay point satisfies the threshold value, actions may be taken to minimize the privacy risk by obfuscating the stay point of the trajectory. These actions may include ceasing to send chunks of probe data points of the trajectory, introducing a gap in the trajectory, or otherwise masking the trajectory as it approaches the stay point.

Embodiments described herein further comprise a process through which false positive identifications of predicted stay points are mitigated. Certain scenarios exist where a stay point is predicted with a relatively high probability; however, the stay point may not materialize. For example, the stay point may be a non-privacy-sensitive stop, or there may not be a stop at all. In such embodiments, a gap is initiated ahead of the predicted stay point, and subsequent probe data points are dropped, even though there was no substantial privacy risk associated with some or all of the subsequent probe data points.

To mitigate false positive detection of stay points, embodiments of the present disclosure buffer probe data points to confirm the presence of a stay point. If a probe in a chunk is classified with a relatively high probability of arriving at a stay point, the chunk or subset of probe data points of the chunk are not provided to the location-based service provider, but the subset of probe data points are not discarded, and a gap is not initiated. Instead, subsequent probe data points are stored, and it is determined whether the stay point that was predicted actually occurs. If a following chunk disproves that the trajectory has entered a stay point (e.g., a false positive), which can be disproven by further movement along a trajectory, the buffered chunk can be published while continuing the split-and-gap anonymization procedure. If the following chunks confirm that the stay point did occur, the buffered chunk and associated probe data points can be discarded, and retroactively a gap can be initiated at the time the stay point was predicted to occur.

The subsequent probe data points that are buffered to mitigate false positives can be collected for a predetermined amount of time. For example, if the prediction of a stay point is not a false positive, the buffered subsequent probe data points should not exceed a maximum buffering time to avoid excess data storage. The time duration of buffered data can be dependent upon requirements of the service provider to which the anonymized data is being provided. Certain use cases can benefit from less time-sensitive probe data, such that a buffering duration may be longer. However, use cases that are temporally sensitive may require probe data that is "fresh" or very recent, such that a buffering duration may be much shorter. If a use case cannot use probe data that is more than a predetermined amount of time old, the buffering duration may be set at that predetermined amount of time or less to maintain fresh data and to avoid storing data that cannot be useful. Another upper bound to the buffer duration can be determined based on the definition of a stay point. For example, if a stay point requires a dwell time of five minutes or greater, the buffer duration may be set to correspond to this time. If probe data is buffered for five minutes without the probe apparatus moving, then a stay point is reached and anonymization is necessary such that the buffered data is discarded. A third consideration in buffer duration may include cost. Buffering of probe data requires memory, such that a cost-benefit analysis of the cost to compute versus value of the probe data can be performed to derive an optimal buffer length. The memory may be local memory on a device, such that the buffer duration may vary depending upon available memory. The service provider receiving the probe data may provide an indication of the value of the data, such that the cost-benefit analysis can consider the use of the data in determining how long the buffer duration should be.

FIG. 9 illustrates an example algorithm used to buffer probe data points while establishing if the prediction of a stay point is a false positive. The split and gap algorithm presumes that a probe can belong to either a sub-trajectory or to a gap, defined by the two modes of "sub-trajectory" and "gap". Example embodiments described herein further include a third mode of "delayed". In the illustrated algorithm of FIG. 9, the stay point detector is the module that detects stay points based on all available probe apparatus' past behavior (e.g., no movement for X minutes). The stay point predictor is a forward-looking classifier that predicts whether the current probe apparatus is about to initiate or has just initiated a stay point. Consequently, the stay point predictor catches stay points and prevents publication before the definition of a stay point has been met. This stay point predictor is a probabilistic classifier that assigns a probability p between zero and one to each probe data point, where higher values constitute a higher likelihood of a stay point. The delayed_size is a duration of a trajectory being "on hold" ($\text{timestamp}_{current\ probe} - \text{timestamp}_{last\ published\ probe}$). For simplicity, the logic is omitted for keeping track of when to initiate a gap (depending on the parameter sub-trajectory size) and when to switch back to publishing data (depending on the parameter gap size). All probes data points arriving are assumed to be the same trajectory and published by the same probe apparatus. This can be achieved in practice through an upstream filtering operation.

FIG. 10 illustrates a flowchart depicting methods according to an example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 10 illustrates a method of anonymizing trajectories of mobile devices, and more particularly, to anonymizing trajectories of mobile devices in real-time or near real-time including obfuscation of stay points of the trajectories. In the illustrated embodiment, a set of probe data points of a trajectory are received at 610 in real-time or near real-time from a probe apparatus as it travels along the trajectory. The set of probe data points may be received, for example, by an OEM 104 from a vehicle or mobile device 114. The probe data points may include at least a location (e.g., latitude and longitude) and a time stamp. For each probe data point, using the associated location, a probability of the trajectory reaching a stay point within a predefined distance is calculated at 620. Sequential sub-sets of probe data points are provided at 630 to a location-based service provider in response to the probe data points including probe data points having a probability of the trajectory reaching a stay point within a predefined distance failing to satisfy a predetermined value. At 640 a potentially last sub-set of the probe data points of the sequential sub-sets of probe data points to provide to the location-based service provider is identified in response to identifying a probe data point having a probability of the trajectory reaching a stay point within the predetermined distances satisfying the predetermined value. The sub-set is potentially the last sub-set of probe data points unless it is determined that a stay point is not reached, resulting in a false positive. If a stay point is actually reached, the potentially last sub-set of probe data points is, in fact, the last sub-set of probe data points to be provided. A subsequent sub-set of probe data point received after the potentially last sub-set of probe data points is stored at 650. This subsequent sub-set is received after a probable stay point has been identified. The subsequent sub-set of probe data points is provided to the location-based service provider at 660 in response to the stay point probe data point having the probability of the trajectory reaching the stay point within the predetermined distance satisfying the predetermined value being identified as a false-positive indication of reaching the stay point within the predetermined distance.

According to example embodiments described herein, probe data points or a sequential sub-set thereof may cease to be provided to a location-based service provider when it is determined that the probability of approaching a stay point within a predefined distance satisfies a predetermined value. This indicates that a probe apparatus is likely to stop soon at a stay point. However, embodiments may resume providing probe data points and/or sequential sub-sets thereof when the probability of reaching a stay point within a predetermined distance falls below the predetermined value. This may be when a probe apparatus resumes travel after a stay point, or may include where a stay point was predicted with a probability satisfying the predetermined value, but subsequent probe data resulted in the probability falling below the predetermined value and provision of probe data or sequential subsets thereof to a location-based service provider may resume. In such an embodiment, the probe data where the approaching stay point was deemed likely may also be provided to the location-based service provider since the likelihood was erroneous.

In an example embodiment, an apparatus for performing the method of FIG. 10 above may comprise a processor (e.g., the processor 202) configured to perform some or each of the operations (610-640) described above. The processor may, for example, be configured to perform the operations (610-640) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-640 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
   receive probe data points of a trajectory in real-time or near real-time from a probe apparatus as it travels along the trajectory;
   calculate, for each probe data point, a probability of the trajectory reaching a stay point within a predetermined distance, wherein a stay point comprises a point where the probe apparatus dwells for at least a minimum amount of time;
   provide sequential sub-sets of probe data points of the trajectory to a location-based service provider in response to the sequential sub-sets of probe data points including probe data points having a probability of the trajectory reaching a stay point within a predetermined distance failing to satisfy a predetermined value;
   identify a potentially last sub-set of probe data points of the sequential sub-sets of probe data points to provide to the location-based service provider in response to identifying a stay point probe data point having a probability of the trajectory reaching a stay point within the predetermined distance satisfying the predetermined value;
   store a subsequent sub-set of probe data points received after the potentially last sub-set of probe data points; and
   provide the subsequent sub-set of probe data points to the location-based service provider in response to the stay point probe data point having the probability of the trajectory reaching the stay point within the predetermined distance satisfying the predetermined value being identified as a false-positive indication of reaching the stay point within the predetermined distance.

2. The apparatus of claim 1, wherein the stay point probe data point is identified as a false-positive indication of reaching the stay point within the predetermined distance in response to probe data points of the subsequent sub-set of probe data points indicating that a stay point was not reached.

3. The apparatus of claim 2, wherein the probe data points of the subsequent sub-set of probe data points indicate that a stay point was not reached in response to the probe data points failing to correspond to a stop for at least the minimum amount of time.

4. The apparatus of claim 2, wherein the probe data points of the subsequent sub-set of probe data points indicate that a stay point was not reached in response to the probe data points failing to correspond to a privacy-sensitive location of a user associated with the probe apparatus.

5. The apparatus of claim 1, wherein the potentially last sub-set of probe data points does not include the stay point probe data point having a probability of the trajectory reaching a stay point within the predetermined distance satisfying the predetermined value.

6. The apparatus of claim 1, wherein causing the apparatus to calculate, for each probe data point, the probability of the trajectory reaching a stay point within the predetermined distance comprises causing the apparatus to:
   calculate the probability of a respective probe data point based, at least in part, on a geometrical complexity of the trajectory up to the respective probe data point.

7. The apparatus of claim 1, wherein causing the apparatus to calculate, for each probe data point, the probability of the trajectory reaching a stay point within the predetermined distance comprises causing the apparatus to:
   calculate the probability of a respective probe data point based, at least in part, on an average speed of the probe apparatus approaching the respective probe data point.

8. The apparatus of claim 1, wherein causing the apparatus to calculate, for each probe data point, the probability of the trajectory reaching a stay point within the predetermined distance comprises causing the apparatus to:
   calculate the probability of the trajectory reaching a stay point within the predetermined distance of a respective probe data point based, at least in part, on a difference between a heading of at least a portion of the trajectory and a heading of the respective probe data point.

9. A computer program product comprising at least one non-transitory computer-readable storage medium having computer-executable program code portions stored therein, the computer-executable program code portions comprising program code instructions configured to:
   receive probe data points of a trajectory in real-time or near real-time from a probe apparatus as it travels along the trajectory;

calculate, for each probe data point, a probability of the trajectory reaching a stay point within a predetermined distance, wherein a stay point comprises a point where the probe apparatus dwells for at least a minimum amount of time;

provide sequential sub-sets of probe data points of the trajectory to a location-based service provider in response to the sequential sub-sets of probe data points including probe data points having a probability of the trajectory reaching a stay point within a predetermined distance failing to satisfy a predetermined value;

identify a potentially last sub-set of probe data points of the sequential sub-sets of probe data points to provide to the location-based service provider in response to identifying a stay point probe data point having a probability of the trajectory reaching a stay point within the predetermined distance satisfying the predetermined value;

store a subsequent sub-set of probe data points received after the potentially last sub-set of probe data points; and provide the subsequent sub-set of probe data points to the location-based service provider in response to the stay point probe data point having the probability of the trajectory reaching the stay point within the predetermined distance satisfying the predetermined value being identified as a false-positive indication of reaching the stay point within the predetermined distance.

10. The computer program product of claim 9, wherein the stay point probe data point is identified as a false-positive indication of reaching the stay point within the predetermined distance in response to probe data points of the subsequent sub-set of probe data points indicating that a stay point was not reached.

11. The computer program product of claim 10, wherein the probe data points of the subsequent sub-set of probe data points indicate that a stay point was not reached in response to the probe data points failing to correspond to a stop for at least the minimum amount of time.

12. The computer program product of claim 10, wherein the probe data points of the subsequent sub-set of probe data points indicate that a stay point was not reached in response to the probe data points failing to correspond to a privacy-sensitive location of a user associated with the probe apparatus.

13. The computer program product of claim 9, wherein the potentially last sub-set of probe data points does not include the stay point probe data point having a probability of the trajectory reaching a stay point within the predetermined distance satisfying the predetermined value.

14. The computer program product of claim 9, wherein the program code instructions to calculate, for each probe data point, the probability of the trajectory reaching a stay point within the predetermined distance comprise program code instructions to:

calculate the probability of a respective probe data point based, at least in part, on a geometrical complexity of the trajectory up to the respective probe data point.

15. The computer program product of claim 9, wherein the program code instructions to calculate, for each probe data point, the probability of the trajectory reaching a stay point within the predetermined distance comprise program code instructions to:

calculate the probability of a respective probe data point based, at least in part, on an average speed of the probe apparatus approaching the respective probe data point.

16. The computer program product of claim 9, wherein the program code instructions to calculate, for each probe data point, the probability of the trajectory reaching a stay point within the predetermined distance comprise program code instructions to:

calculate the probability of the trajectory reaching a stay point within the predetermined distance of a respective probe data point based, at least in part, on a difference between a heading of at least a portion of the trajectory and a heading of the respective probe data point.

17. A method comprising:

receiving probe data points of a trajectory in real-time or near real-time from a probe apparatus as it travels along the trajectory;

calculating, for each probe data point, a probability of the trajectory reaching a stay point within a predetermined distance, wherein a stay point comprises a point where the probe apparatus dwells for at least a minimum amount of time;

providing sequential sub-sets of probe data points of the trajectory to a location-based service provider in response to the sequential sub-sets of probe data points including probe data points having a probability of the trajectory reaching a stay point within a predetermined distance failing to satisfy a predetermined value;

identifying a potentially last sub-set of probe data points of the sequential sub-sets of probe data points to provide to the location-based service provider in response to identifying a stay point probe data point having a probability of the trajectory reaching a stay point within the predetermined distance satisfying the predetermined value;

storing a subsequent sub-set of probe data points received after the potentially last sub-set of probe data points; and providing the subsequent sub-set of probe data points to the location-based service provider in response to the stay point probe data point having the probability of the trajectory reaching the stay point within the predetermined distance satisfying the predetermined value being identified as a false-positive indication of reaching the stay point within the predetermined distance.

18. The method of claim 17, wherein the stay point probe data point is identified as a false-positive indication of reaching the stay point within the predetermined distance in response to probe data points of the subsequent sub-set of probe data points indicating that a stay point was not reached.

19. The method of claim 18, wherein the probe data points of the subsequent sub-set of probe data points indicate that a stay point was not reached in response to the probe data points failing to correspond to a stop for at least the minimum amount of time.

20. The method of claim 18, wherein the probe data points of the subsequent sub-set of probe data points indicate that a stay point was not reached in response to the probe data points failing to correspond to a privacy-sensitive location of a user associated with the probe apparatus.

* * * * *